United States Patent
Ezekiel

(10) Patent No.: US 7,543,935 B2
(45) Date of Patent: *Jun. 9, 2009

(54) SOFT MULTIFOCAL CONTACT LENS

(75) Inventor: Donald F. Ezekiel, West Perth (AU)

(73) Assignee: Iolco Pty Ltd, West Perth (AU)

( * ) Notice: Subject to any disclaimer, the term of this patent is extended or adjusted under 35 U.S.C. 154(b) by 306 days.

This patent is subject to a terminal disclaimer.

(21) Appl. No.: 11/442,694

(22) Filed: May 26, 2006

(65) Prior Publication Data

US 2006/0279695 A1    Dec. 14, 2006

Related U.S. Application Data

(63) Continuation of application No. 10/836,457, filed on Apr. 30, 2004, now Pat. No. 7,052,132, which is a continuation-in-part of application No. 10/149,871, filed as application No. PCT/AU00/01531 on Dec. 13, 2000, now Pat. No. 6,746,119.

(30) Foreign Application Priority Data

Dec. 16, 1999    (AU) .................... PQ4683

(51) Int. Cl.
G02C 7/04    (2006.01)

(52) U.S. Cl. .................. 351/161; 351/160 H

(58) Field of Classification Search ............. 351/160 R, 351/160 H, 161

See application file for complete search history.

(56) References Cited

U.S. PATENT DOCUMENTS

| 3,973,838 | A | | 8/1976 | Page |
| 4,573,775 | A | | 3/1986 | Bayshore |
| 4,614,413 | A | * | 9/1986 | Obssuth ................ 351/161 |
| 4,618,227 | A | | 10/1986 | Bayshore |
| 4,813,777 | A | | 3/1989 | Rainville et al. |
| 5,071,244 | A | | 12/1991 | Ross |
| 5,296,880 | A | | 3/1994 | Webb |
| 5,483,304 | A | | 1/1996 | Porat |
| 5,598,234 | A | | 1/1997 | Blum et al. |
| 5,635,998 | A | | 6/1997 | Baugh |
| 5,786,883 | A | | 7/1998 | Miller et al. |
| 6,109,749 | A | | 8/2000 | Bernstein |

(Continued)

FOREIGN PATENT DOCUMENTS

FR    2582416 A1    11/1986

(Continued)

OTHER PUBLICATIONS

Supplementary European Search Report mailed Nov. 25, 2004, for European Patent Application No. 00984630.4 filed Dec. 13, 2000, three pages.

*Primary Examiner*—Scott J Sugarman
(74) *Attorney, Agent, or Firm*—Morrison & Foerster LLP

(57) ABSTRACT

A multifocal contact lens (10, 50) made of flexible material is able to translocate on an eye by virtue of a lower end (22) of the contact lens (10, 50). being truncated so as to provide a relatively wide surface. The lower end (22) engages with the lower eyelid of a wearer. The lower end (22) may be provided with a forwardly projecting ledge (52).

20 Claims, 6 Drawing Sheets

U.S. PATENT DOCUMENTS

| | | |
|---|---|---|
| 6,746,119 B2 | 6/2004 | Ezekiel |
| 7,052,132 B2 | 5/2006 | Ezekiel |
| 2002/0021410 A1 | 2/2002 | Ye et al. |
| 2004/0017542 A1 | 1/2004 | Lindacher et al. |
| 2004/0233382 A1 | 11/2004 | Lindacher et al. |
| 2005/0068490 A1 | 3/2005 | Mandell et al. |

FOREIGN PATENT DOCUMENTS

| | | |
|---|---|---|
| GB | 1463107 A | 2/1977 |
| GB | 2033101 A | 5/1980 |
| WO | WO-84/04401 A1 | 11/1984 |
| WO | WO-99/23527 A1 | 5/1999 |
| WO | WO-01/44860 A1 | 6/2001 |

\* cited by examiner

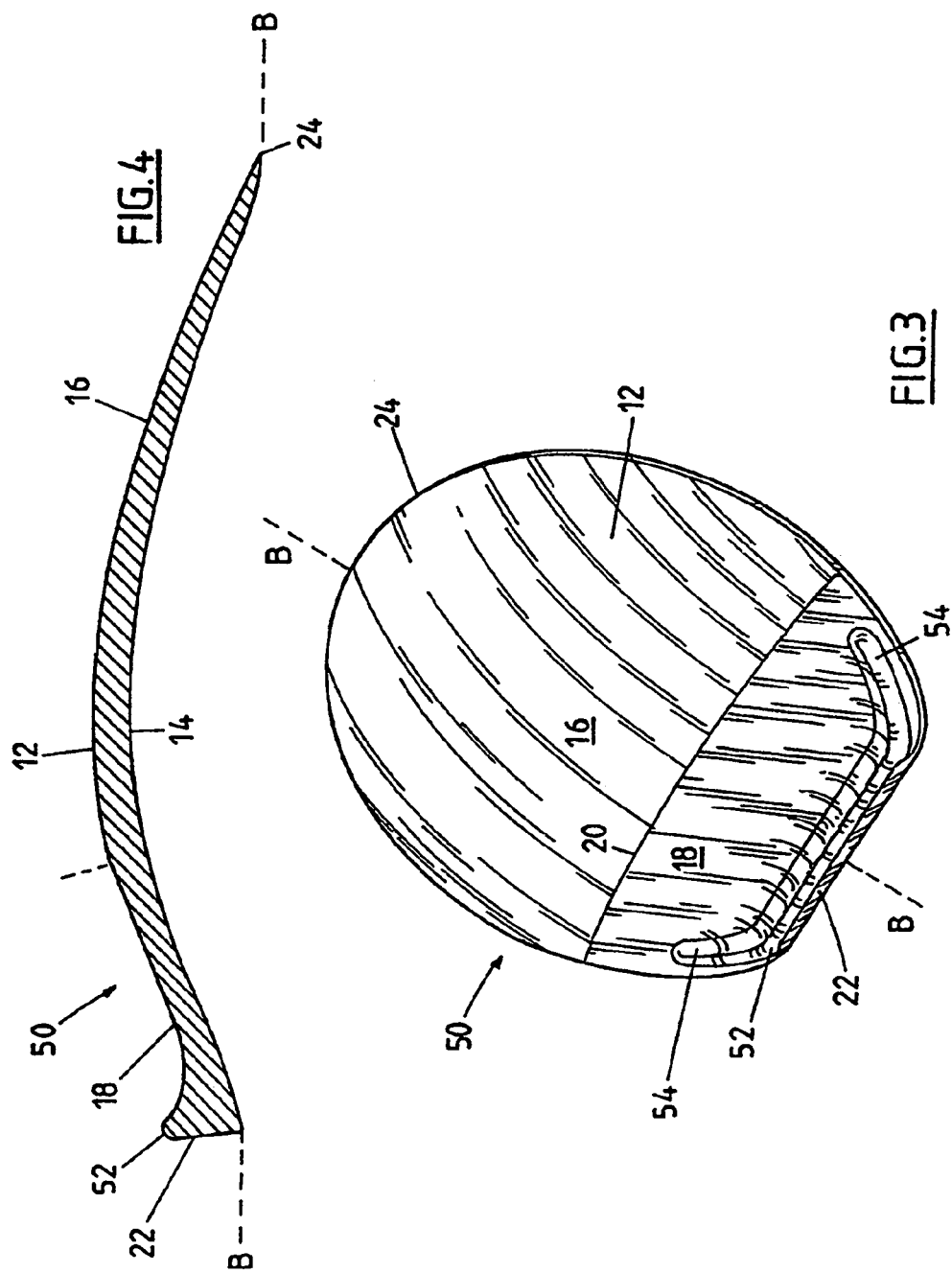

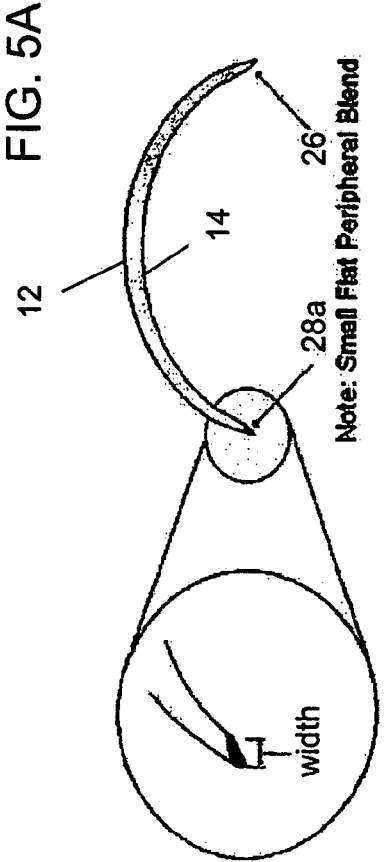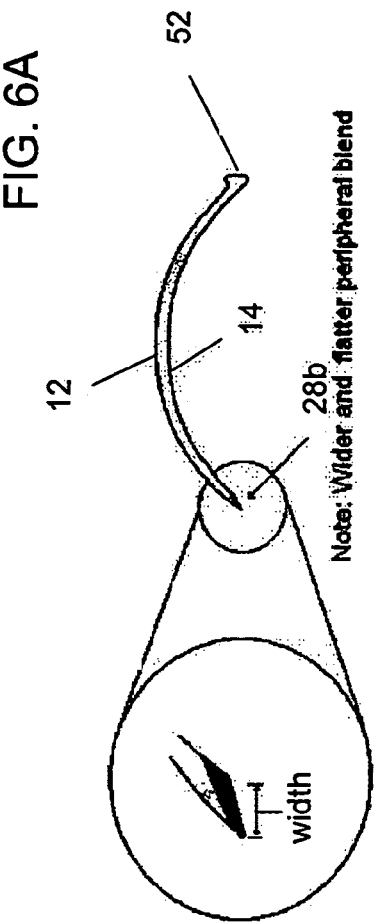

SOFT MULTIFOCAL CONTACT LENS

CROSS REFERENCE TO RELATED APPLICATION

The present application claims benefit of earlier filed patent applications. This application is a continuation of U.S. application Ser. No. 10/836,457, filed on Apr. 30, 2004, and entitled "SOFT MULTIFOCAL CONTACT LENS," which is a continuation-in-part of U.S. application Ser. No. 10/149,871, filed on Jun. 13, 2002, and entitled "SOFT MULTIFOCAL CONTACT LENS," which is a 35 U.S.C. §371 filing of International Patent Application No. PCT/AU00/01531, filed on Dec. 13, 2000, and entitled "SOFT MULTIFOCAL CONTACT LENS," which further claims priority benefit of Australian Patent Application No. PQ4683 filed on Dec. 16, 1999, and entitled "SOFT MULTIFOCAL CONTACT LENS." The entire content of all these related applications are hereby incorporated by reference in their entirety as if fully set forth herein.

BACKGROUND

Field of the Invention

The present invention relates to multifocal contact lens.

SUMMARY OF THE INVENTION

In accordance with one aspect of the present invention there is provided a multifocal contact lens made of flexible material and adapted to translocate on an eye. In one example, the contact lens includes a distant vision segment and a close range vision segment; the lens having a periphery, a front surface, a rear surface having a curvature, an upper end, and a lower end. The distant vision segment is located close to the upper end relative to the close range vision segment which is located close to the lower end. A truncated portion is located at the lower end, the truncated portion being arranged to rest on a lower eyelid, and a forwardly projecting ledge is positioned at the lower end of the contact lens. The forwardly projected ledge is configured so as to project forward of a line formed by a downward extension of the curvature of an adjacent portion of the front surface. In one example, the forwardly projected ledge includes a ridge or raised strip at the lower end of the lens.

In another example, the contact lens includes a distant vision segment and a close range vision segment; the lens having a periphery, a front surface, a rear surface having a curvature, an upper end, and a lower end. The distant vision segment is located close to the upper end relative to the close range vision segment which is located close to the lower end. A truncated portion is located at the lower end, the truncated portion being arranged to rest on a lower eyelid. The distant vision segment and the close range vision segment meet along a substantially straight line. In one example, the line is parallel to the truncated portion when viewed from the front surface. The lens may further include a forwardly projecting ledge at the lower end of the contact lens.

In another example, the contact lens includes a distant vision segment and a close range vision segment; the lens having a periphery, a front surface, a rear surface having a curvature, an upper end, and a lower end. The distant vision segment is located close to the upper end relative to the close range vision segment which is located close to the lower end. A truncated portion is located at the lower end, the truncated portion being arranged to rest on a lower eyelid. The lens further including at least one secondary curve portion located at the rear surface adjacent the periphery, the at least one secondary curve portion having a curvature which is less pronounced than that of the rear surface. The secondary curve portion aids smooth translocation on a patient's eye. Additionally, the lens may further include a forwardly projecting ledge at the lower end of the contact lens.

In another example, the contact lens includes a distant vision segment and a close range vision segment; the lens having a periphery, a front surface, a rear surface having a curvature, an upper end, and a lower end. The distant vision segment is located close to the upper end relative to the close range vision segment which is located close to the lower end. A truncated portion is located at the lower end, the truncated portion being arranged to rest on a lower eyelid, and a forwardly projecting ledge is located at the lower end of the contact lens. The forwardly projecting ledge having a lower surface which is also arranged to rest on the lower eyelid of the user.

The present invention and its various embodiments are better understood upon consideration of the detailed description below in conjunction with the accompanying drawings and claims.

BRIEF DESCRIPTION OF THE DRAWINGS

The present invention will now be described, by way of example, with reference to the accompanying drawings, in which:

FIG. 3 is a front perspective view of a contact lens in accordance with a second embodiment of the present invention;

FIG. 4 is a cross-section along the line B-B of FIG. 3;

FIGS. 5A-5C illustrate cross-sectional views of exemplary contact lens having secondary curve portions;. and FIGS. 6A-6C illustrate cross-sectional views of exemplary contact lens having secondary curve portions.

DETAILED DESCRIPTION OF THE INVENTION

Figure 1:
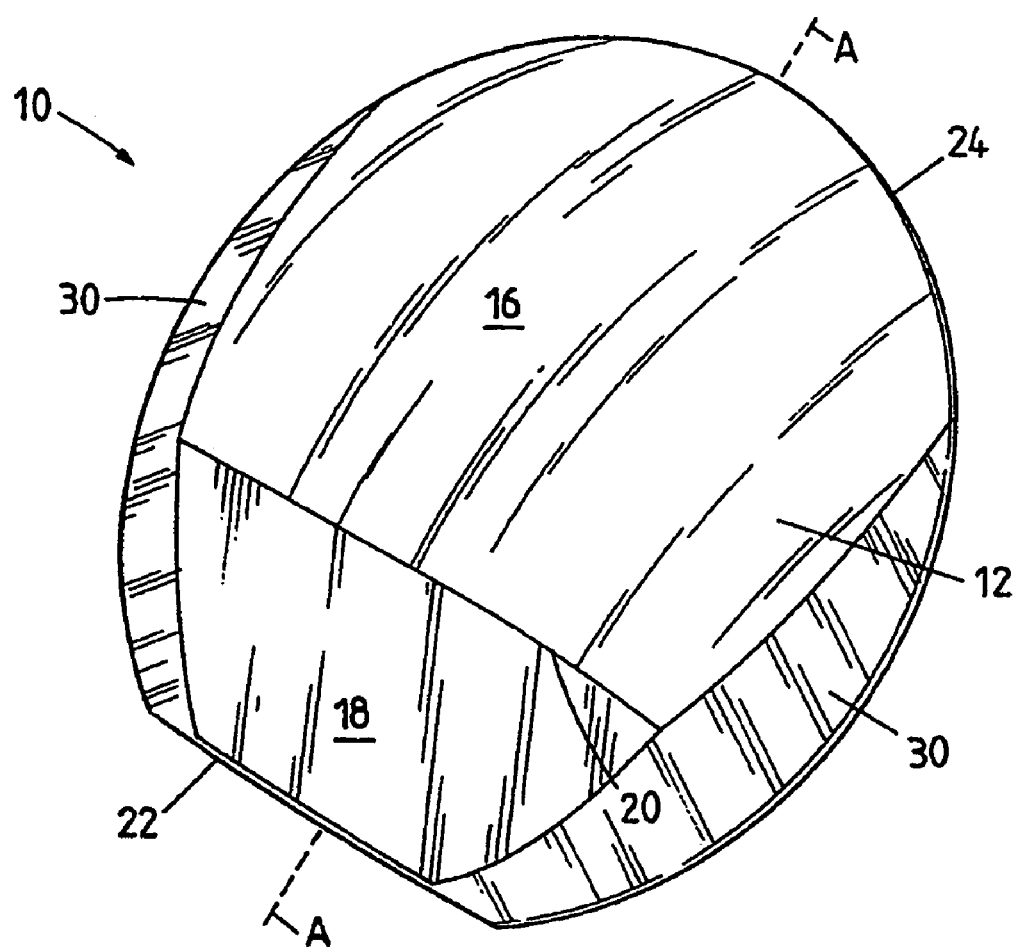
FIG. 1 is a front perspective view of a contact lens in accordance with a first embodiment of the present invention;.
Figure 2:
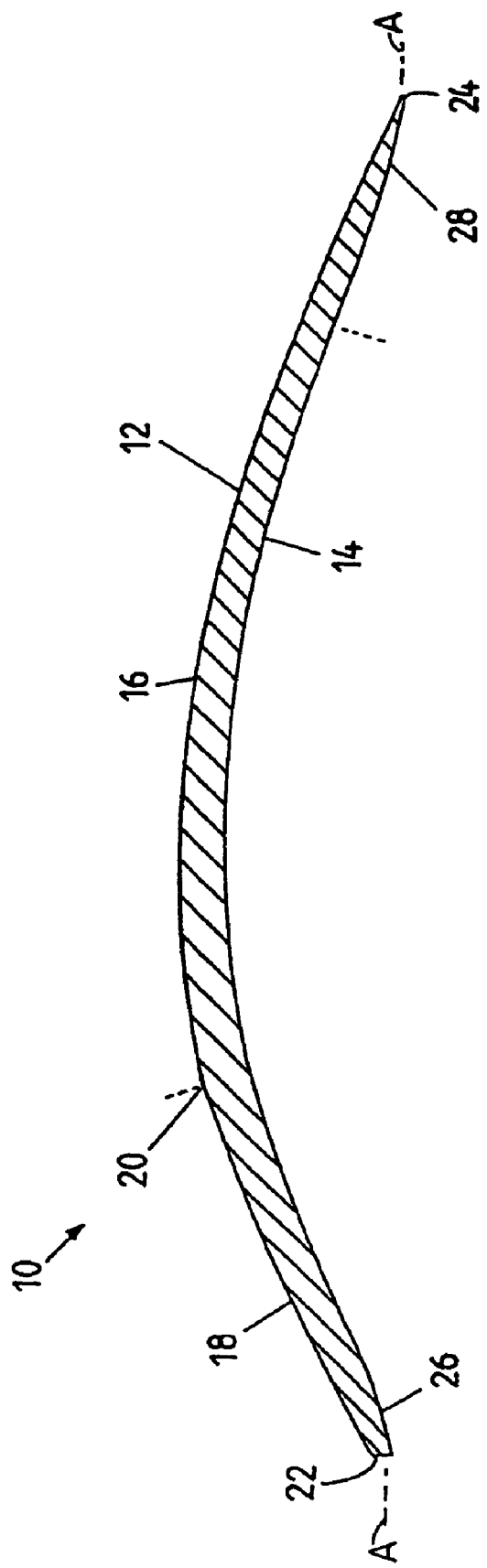
FIG. 2 is a cross-section along the line A-A of FIG. 1.

In FIGS. 1 and 2 of the drawings there is shown a contact lens 10 having a front surface 12 and a rear surface 14.

As shown in the drawings, the front surface 12 is subdivided into a distant vision front segment 16 and a close range vision front segment 18.

A distant vision front segment 16 has a curvature which preferably conforms to a spherical, aspherical or toroidal shape. It has been found that use of an aspherical shape for the front segment 16 enables the lens 10 to be made relatively thin.

Similarly, the close range vision front segment 18 has a curvature which preferably conforms to a spherical, aspherical or toroidal shape. It has been found that the use of an aspherical shape allows for a progressively variable close range reading area.

The segments 16 and 18 may meet along a laterally expanding line 20 as shown in FIG. 1 depending on the respective curvatures of the segments 16 and 18. Alternatively, the segments 16 and 18 may meet at a point.

The segment 18, as can be seen in FIG. 2, may be relatively thick compared to the segment 16 and may be in the form of a prism.

The prism stabilizes the contact lens 10 on the eye and the amount of the prism depends on the lens power but it is preferably sufficient to hold the lens in position on the eye without rotation and without being uncomfortable for the patient.

The contact lens 10 is formed of a flexible material which is also soft. For example the contact lens 10 may be formed of soft hydrogel, silicone or a hybrid material formed from soft hydrogel and silicone or other flexible, non-rigid material. Further, the lens 10 is relatively large being, for example, larger than a corneal lens.

The contact lens 10 has a lower end 22 and an upper end 24. The prism is located adjacent the lower end 22. The presence of the prism adjacent the lower end 22 results in the contact lens 10 having a relatively bulky and heavy portion adjacent to the end 22. The end 22 is, as can best be seen in FIG. 2, truncated so as to leave an end surface which is relatively deep as shown in FIG. 2, compared to a nontruncated end. The truncation of the end 22 allows the contact lens 10 to rest on a lower eye lid of a patient so as to engage and hold the contact lens 10 in position.

Further, the rear surface 14 of the lens 10 is formed in a curved shape which may be spherical or aspherical or may be toroidal to correct for a patient's astigmatism. Further, adjacent the end 22 and the end 24 the rear surface 14 is preferably formed with secondary curve portions 26 or 28 respectively. The secondary curve portions 26 and 28 have a curvature which is less pronounced than that of the rear surface 14 so as to modify the lens fitting on the eye so as to facilitate translocation. The secondary curves may each be a single curve, a series of curves, an aspherical curve, or a combination of these curves.

The secondary curve portions 26 and 28 are less pronounced (i.e., flatter) than the curvature of the main rear surface 14 of lens 10. In various examples, the secondary curve portions 26 and 28 may include one or more of flatter curves, varying widths, varying curves, a series of blended flatter curves, aspheric, or some other design that gradually makes the peripheral secondary curve portions 26 and 28 of lesser curvature (flatter) than the curvature of rear surface 14. The flatter peripheral curve enables lens 10 to more readily move (translate) over the flatter scleral portion of the eye when the eye looks down and the lens translates on the eye as described below.

Figure 5B:
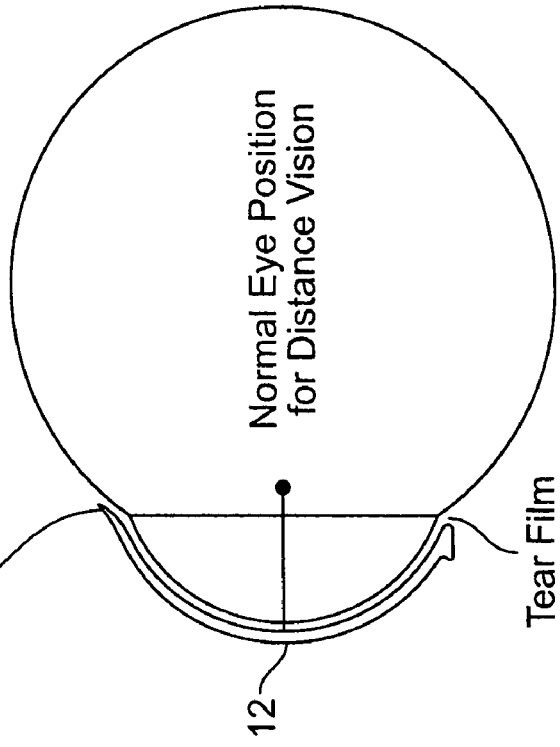
Figure 6B:
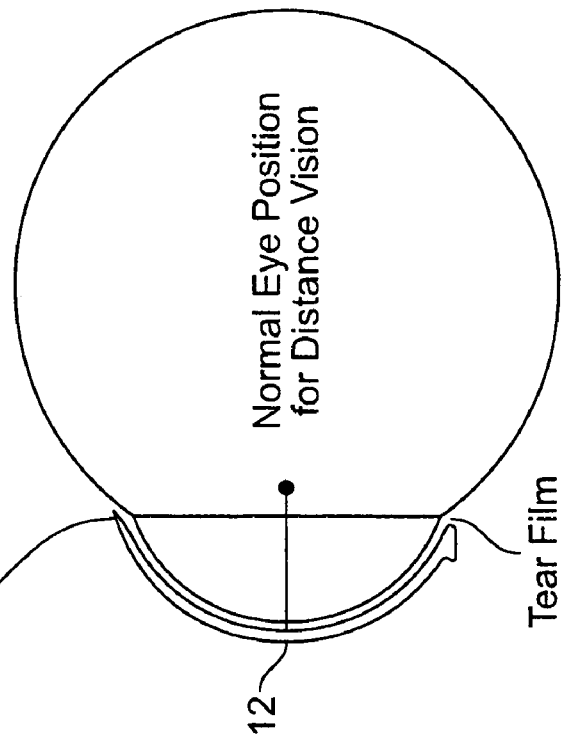
Figure 6C:
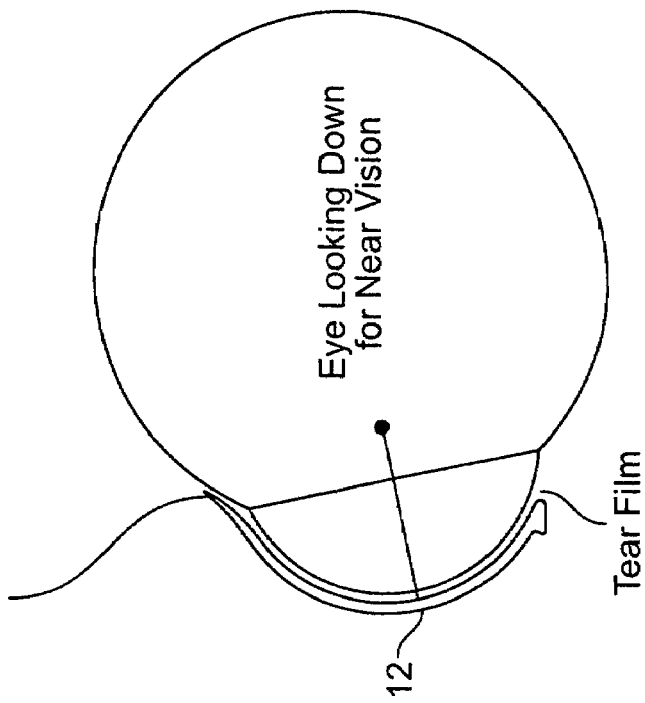
Figure 5C:
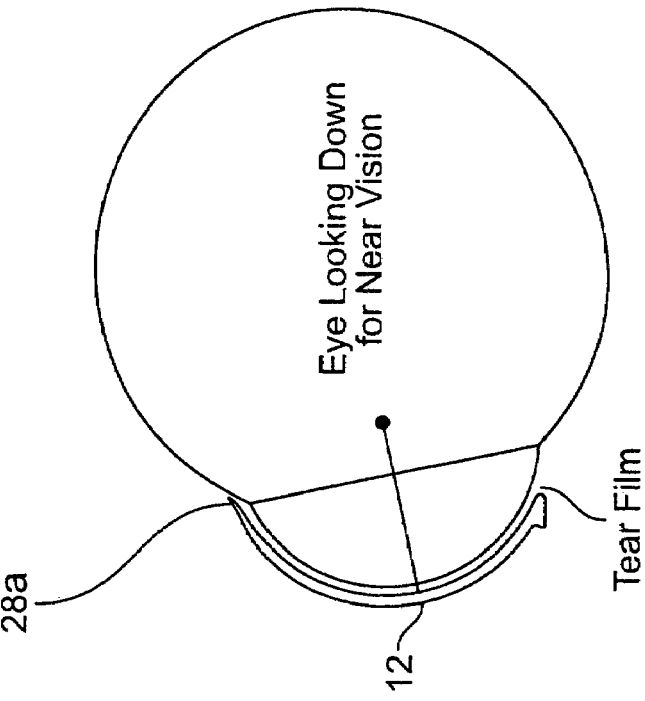

In one example, a translating bifocal lens is provided with a peripheral curvature of sufficient flatness and width to allow for the lens to easily move (i.e., translate) up when the patient looks down and the lower eyelid engages the lower portion of the lens. An exemplary soft lens is shown in FIGS. 5A and 5B, and includes a peripheral curve portion 28a that is approximately 0.5 mm wide and 1.00 mm flatter in radius than the base curvature of rear surface 14 of the lens. FIGS. 6A and 6B illustrate another exemplary lens including a curve portion 28b having a peripheral curvature that is preferably flatter than the curvature of rear surface 14 in the range from 0.75 mm and 3.00 mm, and more preferably between 1.0 mm and 2.75 mm. The width of the peripheral curved portion 28a is preferably in a range from 0.5 mm to 5.0 mm, more preferably 0.75 mm to 4.0 mm, and yet more preferably 1.1 mm to 2.50 mm. As illustrated in FIG. 6B, the sclera (the white area of the eye) generally has a curvature that is flatter than the curvature of the cornea. The flatter and wider peripheral curve of the translating bifocal lens shown in FIGS. 6A and 6B allows the lens to slide or translate easily upwards onto the sclera when the user looks down and the lens engages the ledge 52 as shown in greater detail in FIG. 6C. In contrast, FIG. 5C illustrates the exemplary lens shown in FIGS. 5A and 5B having a less flat and wide peripheral curves (e.g., a curvature closer to the curvature of rear surface 14), which makes translation more difficult as the lens is more likely to dig into the flatter curvature of the sclera.

The secondary curve portions 26 and 28 may only extend along part of the periphery of the lens 10 adjacent the ends 22 or 24 or they could be lengthened to extend around most of or all of the periphery of the lens 10.

The position of the junction 20 between the segments 16 and 18 may be varied as with bifocal spectacle lens, so that the position of the close range vision portion 18 may be customized to each patient. This allows the lens 10 to be fitted precisely to an eye of an individual patient.

As discussed above, the lower portion of the lens 10 adjacent the end 22 is bulkier and heavier than the upper portion adjacent the end 24. This ensures that the lens 10 is orientated in the correct way in use so that the distant vision segment 16 is uppermost and the close range vision segment 18 is lowermost.

Additionally, a lens including an astigmatic or toroidal power correction may be incorporated on either the front surface 12 or rear surface 14 of the lens. A toroidal lens is placed in a specific axis in the lens, and the bifocal lens incorporating the toroidal power is desirably located at a precise and stable position on the eye so the corrective prescription is maintained at the desired position. The truncated end 22 (and/or forwardly projecting ledge 52 described below) is designed to position the lens, resting on the lower lid, such that the lens is in a proper position on the eye during use to enable the corrective power more effectively.

Further, the contact lens 10 may have lateral lenticular portions 30 adjacent sides thereof. The lenticular portions 30, where present, are cut away portions which reduce lens bulk.

The contact lens 10 preferably has an overall size of from 10 to 16 mm preferably from 12.5 to 14.5 mm. The truncation at the lower end 22 may reduce the overall size of the lens by from 0.05 to 5 mm preferably by from 0.5 to 3 mm.

The contact lens 10 could have a third intermediate power vision segment between the segments 16 and 18. Further, the close range vision segment 18 may include an intermediate segment which is preferably a progressively variable or graduated portion for close vision.

In use, the lens 10 of FIGS. 1 and 2 is fitted to a patient's eye with the end 22 resting on the lower eyelid of the patient. Thus, when the patient looks downward, the eye moves relative to the contact lens 10 so that the visual axis is through the close, intermediate or graduated range vision segment 18.

The contact lens 10 cannot move downward because of the engagement between the end 22 and the lower eyelid. Alternatively, when the patient looks up, the eye moves again relative to the contact lens 10 which is retained in place by the weight of the segment 18, so that the visual axis is through the upper portion of the contact lens 10 corresponding to the top portion or distant vision segment 16.

Thus, in operation, the contact lens 10 translocates relative to the eye so that the patient can selectively look through the lower close range vision segment 18 or the distant vision segment 16. Translocation is aided by the presence of the secondary curve portions 26 and 28.

Line 20, illustrating the straight line demarcation between distance segments 16 and 18, provides a bifocal lens without (or at least reduced) undesirable "image jump" when looking from the distant portion of the lens to the close range portion of the lens. In particular, there is no sudden introduction of a prismatic effect by the close range portion at the dividing line, or at least at the point where the eye crosses the dividing line, in the translation of the eye from the distant portion to the close range portion of the lens as common in bifocal lenses having curved demarcation lines. Where the demarcation between distance and close vision segments is curved, the close vision segment exerts a prismatic effect at all points within its circumference relative to the distance portion of the lens. The effect for a user is that all objects seen through the close segment appear to have "jumped" to a new position when transitioning between segments. More particularly, with curved bifocals, the position of the optical centers of the distance and the close range portions of the lens is dependant on the powers of the lens and are always displaced. As the direction of gaze is lowered, the eye meets a gradually increasing prismatic effect as the line of vision moves away from the distance optical center. Just after it crosses the dividing line into the close range portion it suddenly meets the base down effect exerted by the close range segment. The effect on the wearer is that all the objects seen through the segment appear to have jumped to a new position. An obvious effect of the 'jump' is the loss in visual field. The magnitude of the jump depends, at least in part, on the distance between the optical centers of the distance and the close range portions of the lens, which is dependant on the powers of the distance and the close range portions of the lens.

The exemplary configurations described herein, including a straight line 20 between segments 16 and 18, may allow a user's clarity of vision, when looking from the distance to the reading portion of the lens, to be clear and with reduced distortion or blurred vision caused by the different segments. In one example, line 20 is a substantially straight horizontal line along the curvature of the front surface 12, e.g., parallel to lower end 22, when viewed from the major front surface of lens 10. The optical center of a lens is the only point in the lens where there is no prismatic effect. With the straight line bifocal design, the optical centers at least closely coincide resulting in elimination of the image jump (or at least reduced image jump relative to curved demarcation lenses) as the eye moves from the distance portion to the close range portion of the lens. In one example, a bifocal lens includes a straight line dividing the distance and the close range portions of the lens having a virtual superimposition of the optic centers of both the distance and the close range portions on the dividing line.

In FIGS. 3 and 4, there is shown a contact lens 50 which is similar to the contact lens 10 and like reference numerals denote like parts.

In this case, however, the lower end 22 is provided with an integral forwardly projecting ledge 52 which, in use, is arranged to rest on the lower eyelid. The use of the ledge 52 has the advantage that the segment 18 may be made thinner than in the contact lens 10. Alternatively, the ledge 52 may be used in conjunction with a prism to add bulk to the lower part of the contact lens 50 to assist in correct lens orientation.

Further, the use of a thinner segment 18 reduces the overall weight of the contact lens 50. Thus, the contact lens 50 may or may not have the lenticular portions 30 of the contact lens 10.

The ledge 52 may extend across the entire lower end 22 of the lens 50 or over only a portion of the lower end 22. Typically, the ledge 52 may be from 2 to 10 mm, preferably from 4 to 6 mm wide at the end 22 where the contact lens 50 is truncated.

The presence of the ledge 52 adds bulk to the lower end 22 so allowing good lid action on the contact lens 50 to allow for lens translocation.

Further, as can be seen in FIG. 3, the ledge 52 may be provided with upwardly curved end portions 54 which act as weights and help to stabilize the contact lens 50 in use. The ledge 52 and the portions 54 may be conveniently formed by means of a lather or incorporated in a mould depending on the method of manufacture. Modifications and variations as would be apparent to a skilled addressee are deemed to be within the scope of the present invention.

Additionally, in one example, ledge 52 may be configured to project forward of a line formed by a downward extension of curvature of an adjacent portion of the front surface 12, for example, extending forward of the curvature of the lower, close range portion 18. The forwardly projecting ledge 52 thereby forms a ridge or elevated portion extending out from the adjacent surface, which is configured to assist in abutting a patient's eyelid and thereby aid in translocation of the lens on the eye. In one example, ledge 52 includes a raised strip formed along a portion of close range portion 18 and adjacent the lower end 22.

The above detailed description is provided to illustrate exemplary embodiments and is not intended to be limiting. It will be apparent to those of ordinary skill in the art that numerous modification and variations within the scope of the present invention are possible. Further, various combinations of different examples may be used alone or in combination. Additionally, particular examples have been discussed and how these examples are thought to be advantageous or address certain disadvantages in related art. This discussion is not meant, however, to restrict the various examples to methods and/or systems that actually address or solve the disadvantages.

I claim:

1. A multifocal contact lens, comprising
   a distant vision segment;
   a close range vision segment;
   the lens having a periphery, a front surface, a rear surface having a curvature, an upper end, and a lower end, wherein the distant vision segment and the close range vision segment meet along a line along the front surface; and
   a forwardly projecting ledge disposed close to the lower end, the forwardly projected ledge for translocating the contact lens on an eye.

2. A multifocal contact lens according to claim 1, wherein the forwardly projecting ledge includes a ridge extending forward of the front surface of the lower end of the contact lens.

3. A multifocal contact lens according to claim 1, wherein the forwardly projecting ledge includes a raised strip along the lower end of the contact lens.

4. A multifocal contact lens according to claim 1, further including a truncated portion located at the lower end, wherein the truncated portion is arranged to rest on a lower eyelid and wherein the forwardly projecting ledge is also arranged to rest on the lower eyelid.

5. A multifocal contact lens according to claim 4, wherein the truncated lower end and the forwardly projecting ledge have respective end surfaces which are coplanar with one another and are substantially straight.

6. A multifocal contact lens according to claim 1, further including at least one secondary curve portion located at the rear surface adjacent the periphery; the at least one secondary curve portion having a curvature which is less pronounced than that of the rear surface.

7. A multifocal contact lens according to claim 1, wherein the forwardly projecting ledge extends substantially along the entire lower end of the lens.

8. A multifocal contact lens according to claim 1, wherein the forwardly projecting ledge further includes upwardly curved end portions.

9. A multifocal contact lens according to claim 1, wherein at least part of the periphery of the contact lens is formed with a lenticular portion adjacent the sides of the contact lens.

10. A multifocal contact lens according to claim 1, where in the close range vision segment is relatively thick compared to the distant vision segment.

11. A multifocal contact lens according to claim 1, wherein a lower portion of the lens which is close to the lower end is heavier than an upper portion of the lens which is close to the upper end.

12. A multifocal contact lens according to claim 1, wherein the close range vision segment includes a prism.

13. A multifocal contact lens according to claim 1, wherein the distant vision segment is spherical, aspherical, or toroidal in shape.

14. A multifocal contact lens according to claim 1, wherein the close range vision segment is spherical, aspherical or toroidal in shape.

15. A multifocal contact lens according to claim 1, wherein the contact lens is made of flexible material.

16. A multifocal contact lens according to claim 1, wherein the contact lens is of unitary construction.

17. A multifocal contact lens according to claim 1, wherein the rear surface has a spherical, aspherical, or toroidal shape.

18. A multifocal contact lens according to claim 1, wherein junctions between segments extend laterally across the front surface.

19. A multifocal contact lens according to claim 1, wherein the straight line where the close range vision segment and distant range vision segment meet is parallel to the truncated portion as viewed from the front surface.

20. A multifocal contact lens according to claim 1, wherein the distance vision segment and the close range segment meet in the line along the front surface such that there is no image jump effect when an eye translates form the distance vision segment to the close range vision segment.

* * * * *